(12) United States Patent
Eswarappa

(10) Patent No.: US 6,467,481 B1
(45) Date of Patent: Oct. 22, 2002

(54) STACKABLE FILTER DEVICE

(75) Inventor: Muniyapla T. Eswarappa, Andover, MA (US)

(73) Assignee: Vase Technology, Lawrence, MA (US)

( * ) Notice: Subject to any disclaimer, the term of this patent is extended or adjusted under 35 U.S.C. 154(b) by 0 days.

(21) Appl. No.: 09/447,131

(22) Filed: Nov. 22, 1999

Related U.S. Application Data

(60) Provisional application No. 60/131,834, filed on Apr. 29, 1999.

(51) Int. Cl.⁷ .............................................. A62B 19/00
(52) U.S. Cl. ........................... 128/206.17; 128/205.27; 128/205.29
(58) Field of Search ...................... 128/201.17, 205.27, 128/205.29, 206.17, 206.19; 210/232, 323.2; 55/511, 508; 95/267, 268

(56) References Cited

U.S. PATENT DOCUMENTS

| 2,130,555 A | | 9/1938 | Malcom ....................... 183/71 |
| 2,227,959 A | * | 1/1941 | Cover ......................... 183/71 |
| 2,235,624 A | | 3/1941 | Schwartz ..................... 183/44 |
| 2,521,060 A | * | 9/1950 | Hallinan ..................... 210/183 |
| 2,787,333 A | | 4/1957 | Boone et al. ................ 183/4.3 |
| 2,951,551 A | | 9/1960 | West .......................... 183/4.3 |
| 3,161,491 A | | 12/1964 | Gongoll et al. ............... 55/502 |
| 3,246,920 A | * | 4/1966 | Pall ............................ 285/237 |
| 3,606,737 A | | 9/1971 | Lefevre ....................... 55/319 |
| 4,058,465 A | * | 11/1977 | McKee ....................... 210/356 |
| 4,105,562 A | * | 8/1978 | Kaplan et al. .............. 210/232 |
| 4,192,750 A | * | 3/1980 | Elfes et al. ................. 210/133 |
| 4,228,012 A | * | 10/1980 | Pall ............................ 210/238 |
| 4,336,043 A | * | 6/1982 | Aonuma et al. .............. 55/483 |
| 4,886,056 A | | 12/1989 | Simpson ................ 128/201.25 |
| 5,062,421 A | | 11/1991 | Burns et al. ........... 128/205.27 |
| 5,084,175 A | * | 1/1992 | Hoffmeier ................... 210/344 |
| 5,112,503 A | * | 5/1992 | Raifman ..................... 210/777 |
| 5,211,846 A | * | 5/1993 | Kott et al. .................. 210/232 |
| 5,230,727 A | * | 7/1993 | Pound et al. ................. 55/492 |
| 5,405,528 A | * | 4/1995 | Selbie et al. ................ 210/232 |
| 5,407,571 A | * | 4/1995 | Rothwell .................... 210/232 |

(List continued on next page.)

FOREIGN PATENT DOCUMENTS

| EP | 0 342 807 | 11/1989 |
| EP | 0 674 931 | 10/1995 |
| FR | 2.127.360 | 10/1972 |

OTHER PUBLICATIONS

Flexi–filter Advertisement; unknown date.

Primary Examiner—Aaron J. Lewis
Assistant Examiner—Mital Patel
(74) Attorney, Agent, or Firm—Fitzpatrick, Cella, Harper & Scinto

(57) ABSTRACT

A stackable filter device for filtering an input to a source of suction comprises: a substantially hollow filter pad having first and second filter walls constructed of a filter material, the periphery of the first filter wall being sealingly engaged to the periphery of the second filter wall to form the filter pad, each of the filter walls having an aperture. The first and second filter walls each have an annular member fixedly contacted to the circumferential edge of the aperture. The annular members support the aperture, and are structured so as to integrally form connectors operable to removably connect the filter device to the source of suction or to an additional filter device on a first side of the filter device and to a sealing end cap or an additional filter device on a second side of the filter device. The filter device preferably includes a tubular stiffening member passing through the filter device. The stiffening member is rigidly attached at each end thereof to one of the annular members. The stiffening member comprises a perforated tubular shaft forming an air passage through the filter device.

19 Claims, 9 Drawing Sheets

U.S. PATENT DOCUMENTS

| | | | | |
|---|---|---|---|---|
| 5,453,184 A | * | 9/1995 | Handtmann | 210/193 |
| RE35,062 E | | 10/1995 | Brostrom et al. | 128/206.12 |
| 5,549,821 A | * | 8/1996 | Bounnakhom et al. | 210/232 |
| 5,579,761 A | * | 12/1996 | Yuschak et al. | 128/206.17 |
| 5,647,356 A | | 7/1997 | Osendorf et al. | 128/206.17 |
| 5,906,737 A | * | 5/1999 | Hoeppner | 210/232 |
| 5,941,244 A | * | 8/1999 | Yamazaki et al. | 128/206.19 |
| 6,001,145 A | * | 12/1999 | Hammes | 55/471 |
| 6,044,842 A | * | 4/2000 | Pereira et al. | 128/202.27 |
| 6,055,983 A | * | 5/2000 | Metzger | 128/206.17 |

* cited by examiner

STACKABLE FILTER DEVICE

CROSS-REFERENCE TO RELATED APPLICATION

This application claims benefit of U.S. Provisional Application No. 60/131,834, filed Apr. 29, 1999, which is hereby incorporated by reference.

BACKGROUND OF THE INVENTION

1. Field of the Invention

The present invention relates generally to the field of air filter devices. More particularly, filter devices structured for coupling with a breathing apparatus, such as a respirator or mask or other source of suction, and so as to provide multiple filter elements functioning as a single filtering unit.

2. Description of the Related Art

When a person is subject to adverse breathing conditions, such as in an environment contaminated with airborne particles and/or harmful vapors, that person's safety and health will require some type of device for filtering the air before it passes into his or her lungs. To achieve this goal, requirements for such filtering devices have been codified (42 C.F.R. §84) by the National Institute of Occupational Safety and Health (NIOSH). NIOSH regulations were revised to be made substantially more stringent (in June 1995, with a grandfather clause for three years, effective June 1998), to require that these filtering devices demonstrate increased efficiency, a measure of its ability to remove contaminants from air as it is drawn (breathed) through the filtering device.

Historically, improvements in the efficiency of a filtering device have resulted in a concomitant increase in the difference in air pressure between the environment and the interior of the filtering device required for drawing air through it at a given rate. This pressure differential is commonly referred to as pressure drop of the filtering device. Further, increased efficiency in a filtering device also typically has led to a reduction in the effective life span of the filtering device. Consequently, with prior art filtering devices, greater safety through improved filter efficiency has typically made such devices difficult to breathe through and of extremely limited life span. As a result, in addition to breathing discomforts, users experience frequent periods of down time as they must either leave the work area and/or stop working to remove and replace filtering devices.

Accordingly, it has long been a goal of those in the field of filtering devices to develop a filtering device that meets the natural and codified safety requirements of users while demonstrating a pressure drop that is sufficiently low to allow comfortable breathing by the user and, even more importantly, while A functioning effectively for a greater period of time.

To attain such improvements, inventors have manipulated the shapes and sizes of the air filters to maximize surface area in the hope that, with increased area over which filtering can be conducted, acceptable efficiency can be realized while at the same time affording the user a low pressure drop and, thus, comfortable breathing. However, filters can be made only so large before they begin to interfere with a user's vision or mobility. Inventors have also experimented with improved materials in attempted furtherance of the same goals. To date, even slight improvements in efficiency, pressure drop, or life span have been hailed as marked improvements in the art.

One attempt to increase the surface area of the filter is illustrated in U.S. Pat. No. 2,130,555 to Malcolm. The Malcolm patent shows a dust filter unit of a generally tubular form, but having within the unit a filter having a plurality of bellows-like folds. The bellows-like folds provide increased surface area in the filter without the necessity of increasing the diameter of the unit.

The filter unit shown by Malcolm has the advantage of increasing the surface area of the filter medium. However, the folds are part of an integrally formed filter media. Therefore, the design does not permit more or less surface area to be used in accordance with particular needs.

U.S. Pat. No. 2,227,959 to Cover shows a filter composed of three elements connected to one another. The three elements are each structured differently from one another so as to be placed at an assigned position in the filter. However, the device requires specialized innermost and outermost filter elements, which would require that at least three types of filter units be kept in stock at all times. Further the construction of the filter shown in Cover, in which the filter walls are tucked into a cavity in a retaining plate, would be somewhat prone to leakage, compared to modern units in which the filter walls are sealingly engaged to one another around their periphery, and might not meet the more stringent standards in effect today, such as those promulgated by NIOSH.

U.S. Pat. No. 2,235,624 to Schwartz shows a filter unit for respirators having a cylindrical filter casing of a depth sufficient to hold two disk-shaped filter pads. The filter pad within the casing farthest away from the breathing mask is formed of two circular pads stitched together circumferentially at the edges to form the disk-shaped filter pad, and having an aperture formed through both circular pads to allow a supporting tube element to pass there through. The disk-shaped filter pad closest to the mask is formed similarly but is only apertured on one side. The supporting tube enters the aperture of this innermost pad and comes to an end therein without passing entirely through the innermost pad.

The filter unit taught by Schwartz has several disadvantages. For one thing, the requirement of rigidity of the outer cylindrical filter holder would tend to increase the weight of the mask. Also, since the depth of the filter holder is set, only a set number of the disk-shaped filter pads may be used. Moreover the innermost filter pad is of a different construction than the outermost pad, which means that, similar to the situation in the Cover patent, two types of replacement filter elements must be maintained in stock.

U.S. Pat. No. 2,951,551 to West shows an air purifying cannister that is formed from individual filtration units fitted together. Each unit has a male as well as a female connector and a rigid outer wall. The units may be mated in series ad infinitum to form a composite cannister of desired length. Each unit has a tube formed therethrough to allow for the passage of already-filtered air from one unit to the next. The tube is fitted with a cap on the unit farthest from the mask or source of suction to prevent unfiltered air from entering the tube.

The West filter unit, due to the requirement for rigidity, would become very heavy and would be very uncomfortable for the wearer after prolonged use, especially in comparison to the light-weight simple disk filter pad units currently preferred for long term use. Further the weight of the cannister, as additional units are added, would cause a great deal of stress to be applied to the air inlet of any mask using the filter, which may lead to fatigue of the connection materials and eventual breakage.

A common disadvantage of the types of filter units described above is the high ratio of non-functioning structural materials to functioning filtration material. As a result of this ratio, providing the user with increased filter surface area would result in an associated increase in weight of the filter. Modern filter units are expected to be light in weight, to ensure the comfort of the user.

A prevalent type of light-weight filter pad currently in use is the 3M® P100 Particulate filter, which consists of a single light-weight disk-shaped unit, formed of two fabric filter pads affixed to one another around the circumference of each pad. One of the filter pads has a central aperture being supported around its periphery by a plastic fastener integrally formed with a bayonet-style female connector, formed to enable a locking connection with a counterpart male connector at the input or inputs of a breathing mask.

However, while the 3M® P100 filter pad offers the advantage of light weight, due to its construction it can function only as a single unit. Further, because the pad is soft, installation and removal of the filter pad exerts torsional and crushing stress on the filter material as the user grips and twists the filter to engage or disengage the connector that mates with the mask.

Thus, in view of the above deficiencies of the prior art devices, the need exists for a filter unit that is of very light weight but which can be stacked to any level of stacking so as to customize the filter depending upon the use and the environment. There also is a need for such a stackable filter in which each stackable unit thereof is of identical construction. Further, there is a need for a filter structured to permit installation and removal without the application of possibly damaging stresses to the filter fibers.

One of the very commonly experienced problems in using presently available breath protection equipment, is the difference in the level of protection and breathing comfort experienced from the start of a fresh set of filtering units, and the level of protection and breathing comfort towards or at the end of the expected life cycle (end of life,) of these filter units. Most of these filters and filter units do not have an "end of life" indicator. This leaves it up to the user to estimate the life remaining in a filter, which may result in serious breathing discomfort, and sometimes a lack of protection. All of this can lead to the wearer's exhaustion, injury and damage to his or her health, and the resulting loss of productivity. As a result, wearers of these filter devices often end up discarding them long before the end of the expected life span, thereby increasing the cost of protection.

In addition to the problems discussed above, an end user of a filter device has to go through a series of trials and errors before determining the optimum fit for the device, such as a mask, to which the filters are connected. In carrying out this trial and error process, the end user could damage a number of filter devices. Further, if the end user's hands are contaminated, as is usually the case, he would need the help of another individual with clean hands. This would limit the usability of these filter devices, drive up the cost of their use because of the higher number of labor hours required, and may lead to or exacerbate problems and inconveniences, such as language problems, difficulty in achieving the optimum fit, interpersonal relations between the user and helper, and so on.

Another difficulty faced by users of filtration devices is the requirement that a "fit check" be performed. Fit check is a method by which the wearer blocks the air inlet(s)—where the filter device(s) would fit into and be attached to the respirator or mask, and takes a deep inhaling breath, thereby creating a vacuum inside the respirator or mask. If the respirator or mask properly fits around the face of the wearer, he should feel this vacuum, and not feel any air leakage around the periphery of the mask where it contacts his face.

Because of the increased awareness of environmental safety, and in view of the increase in the use of toxic and other materials dangerous to health in the industrial processes, fit check has come to be seen as an important requirement for effective usage of these sophisticated breathing protection devices. That is, if the breathing protection device does not fit/seal properly around the face of the wearer, all the advances in the filtering devices will be to little avail. However, filter pads such as the 3M® P100 do not allow a fit check to performed while the filter is connected to the mask.

In light of the foregoing, it becomes clear that a filtering device furthering the seemingly incompatible goal of improving efficiency while decreasing pressure drop and increasing the effective life span of the filtering device, and additionally providing a means for performing fit check while the filter is attached to the mask, would represent a significant advance over the prior art.

SUMMARY OF THE INVENTION

In view of the above-mentioned problems of prior art devices, and the needs and concerns of users of filtration devices, it is an object of the present invention to provide a filtering device that demonstrates improved efficiency while exhibiting reduced pressure drop, an extended usable life span, and ideally is structured to facilitate the use of the fit check method. It is a further object of this invention to provide the end user with the ability to customize the number of filter elements or devices on his or her respirator mask, or such other apparatus, to provide an optimum combination of protection, breathing comfort and cost for the situation at hand. With this ability, the user may combine old/used filter unit or units with new/fresh filter unit or units, thereby allowing him to achieve a customized level of comfort to carry on his job where breathing protection is required.

It is another object of the present invention to provide each individual wearer the ability to design fit the total filter to his own comfort level, and at the same time maintain breathing comfort throughout his work period. In addition, it is an object of the present invention to provide safety to the user even when using a filter device beyond its safe level.

It is another object of the present invention to make it possible to keep very low levels of inventory of filters and filter devices, while providing adequate supply at the same time, by providing identical, stackable filtration units.

It is yet another object of the present invention to provide a means for connecting and disconnecting the filter device from a mask or additional filter unit without applying stress to delicate filter material.

Additional objects and advantages of the present invention will become clear in view of the detailed description and the accompanying diagrams.

In furtherance of the above and other objects, there is provided a stackable filter device for filtering an input to a source of suction. The device comprises: a substantially hollow filter pad having first and second filter walls constructed of a filter material, the periphery of the first filter wall being sealingly engaged to the periphery of the second filter wall to form the filter pad, each of the filter walls having an aperture. The first and second filter walls each have an annular member fixedly contacted to the circumferential edge of the aperture. The annular members support the aperture, and are structured so as to integrally form connectors operable to removably connect the filter device to the source of suction or to an additional filter device on a first side of the filter device and to a sealing end cap or an additional filter device on a second side of the filter device. The filter device preferably includes a tubular stiffening member passing through the filter device. The stiffening member is rigidly attached at each end thereof to one of the annular members. The stiffening member comprises a perforated tubular shaft forming an air passage through the filter device.

DETAILED DESCRIPTION OF THE PREFERRED EMBODIMENTS

Preferred embodiments of the present invention for a filter device will now be described with reference to the accompanying drawings.

Figure 1:
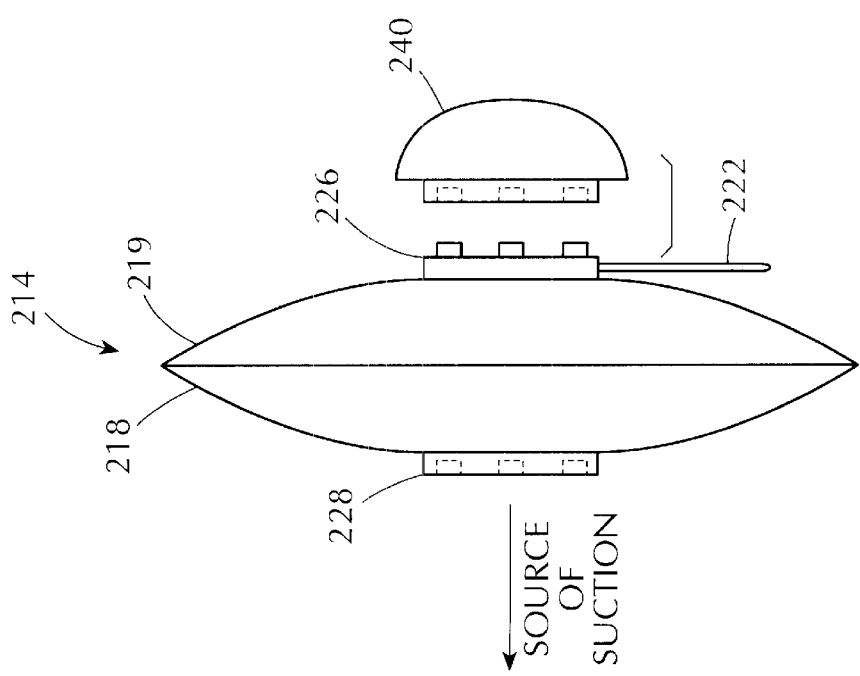
FIG. 1 is a side view of the filter device of the present invention in accordance with a preferred embodiment.

FIG. 1 shows a filter device 214 in accordance with a preferred embodiment of the present invention. As shown in the figure, the filter device 214 is constructed from two filter layers 218 and 219 joined together at the periphery in any conventional manner, including but not limited to sealing, gluing, bonding, ultrasonic welding, and so on. Filter layers 218 and 219 each have an aperture located at the center of their surface area. This aperture is supported by a plastic fastener, or other supporting structure, that is formed also to function integrally as a connector. As shown in the figure, female connector 228 and male connector 226 are preferably formed on opposite surfaces of the filter device 214. For example, in the figure, the female connector 228 is shown as being located on filter layer 218 with the male connector 226 being shown as being located on filter layer 219. While the present invention can be realized with both filter layers having a female connector or both having a male connector, in this embodiment, each filter unit 214 has a female connector 228 and a male connector 226 on opposite sides thereof.

An end cap 240, shown as a female end cap to mate with the male connector 226, is used to seal the aperture on the side of the filter device 214 that is furthest away from the source of suction. Although in the subsequent description and drawings a female end cap is shown, the invention is in no way limited to the disclosed configuration. For example, if the source of suction had a female connector, then male connector 226 of the filter device would mate with the source of suction and a male end cap would be utilized to seal the opposite side aperture.

Figure 2:
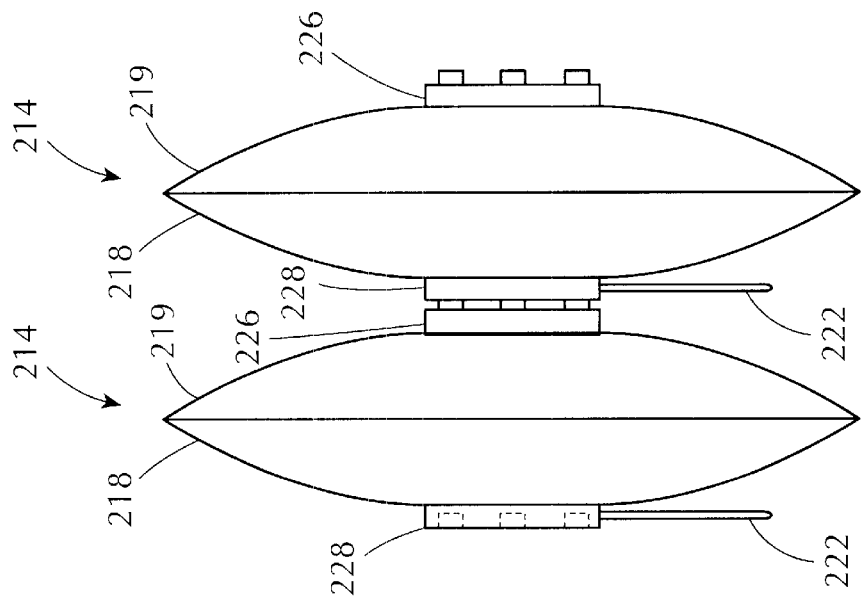
FIG. 2 is a side view showing two filter devices in accordance with the preferred embodiment of the present invention mated together to function as a unit.

This configuration allows multiple filter units to be connected in series, as is shown in FIG. 2. FIG. 2 shows two filter devices so connected. Although not visible in the drawing, the male connector of the leftmost filter device is connected to the female connector of the adjacent unit to its right. This stacking can be continued indefinitely to allow a user to stack multiple filter units to increase the filtering surface area.

Figure 1B:
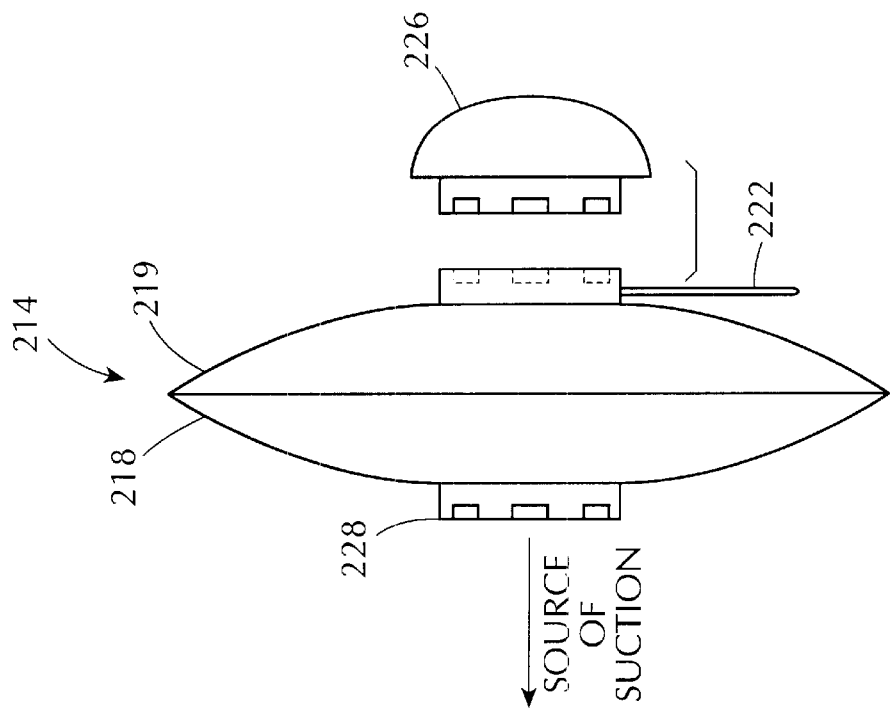
FIGS. 1A and 1B are side views of the filter device of the present invention using press fit and bayonet connectors, respectively.
Figure 1A:
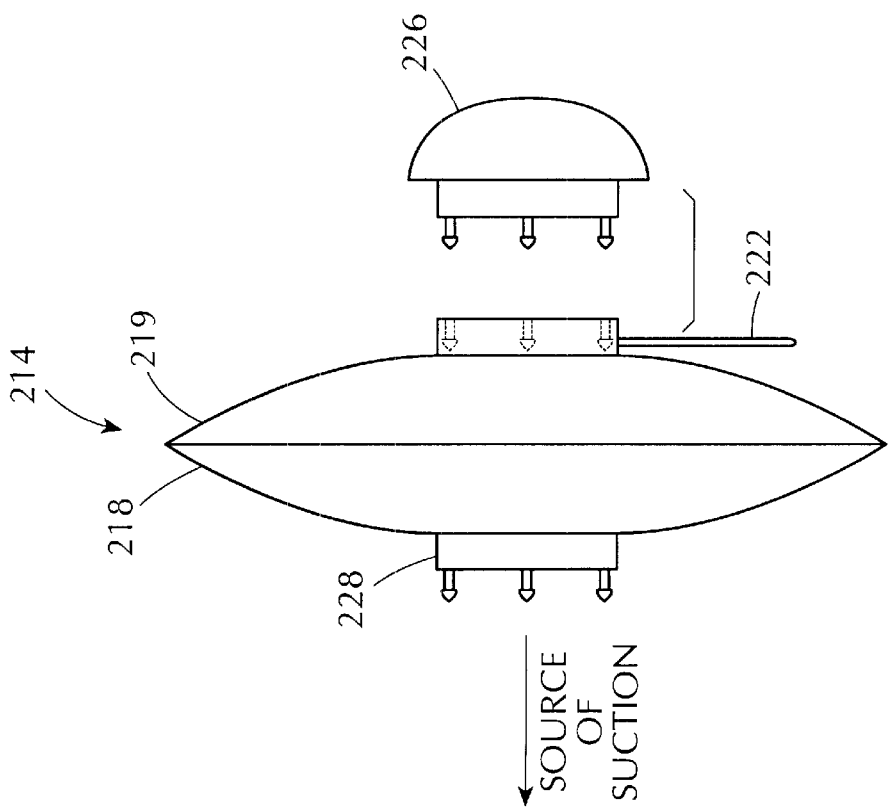

The connectors can be of any known type that provides a tight secure seal, such as, but not limited to snap-on, bayonet type, press-fit, push-and-twist type and so on. A push-and-twist connector is shown in FIG. 1, a press-fit connector is shown in FIG. 1A and a bayonet connector is shown in FIG. 1B. By interlocking a male connector of a filter device, with a corresponding female connector of another filter device, a multi-unit filter can be created as and when required, such as in atmospheres with increased contamination or in difficult to breathe situations, including the partial fouling/choking of the filter unit already in use. This process of addition of the filter devices can be continued until the wearer achieves a balance between comfort, protection and cost. Alternately, if the wearer moves into an area where breathing is easy, he can remove some or all of the added filter devices leaving only the device closest to the respirator. Hence this invention allows the wearer to design fit the filter, by adding or removing filter devices to achieve optimum comfort, protection and cost.

Unlocking/locking lever 222, which will be described in greater detail below, comprises a lever arm that extends radially from one of the connectors and allows the user to install and remove one or more of the filter devices 214 without having to handle the soft filter material. When twisting the filter devices with respect to one another, or with respect to the mask/respirator, the user grips the lever or levers 222 to impart the relative twisting motion required for the installation or removal of one or more of the filter devices.

End cap 240 functions to seal the outer aperture of the outermost filter device, preventing unfiltered air from entering the aperture located at that surface. Whenever the wearer adds or removes a filter device or devices, including the first filter device, it is imperative that the end cap be used to close the open end of the connector. In the most common case of alternating male and female connectors, the outer cap will be of the same type as the innermost connector, that is, the connector that fits into the breather unit, although in the following drawings it will be shown as female. The cap can have male or female fittings.

Figure 3:
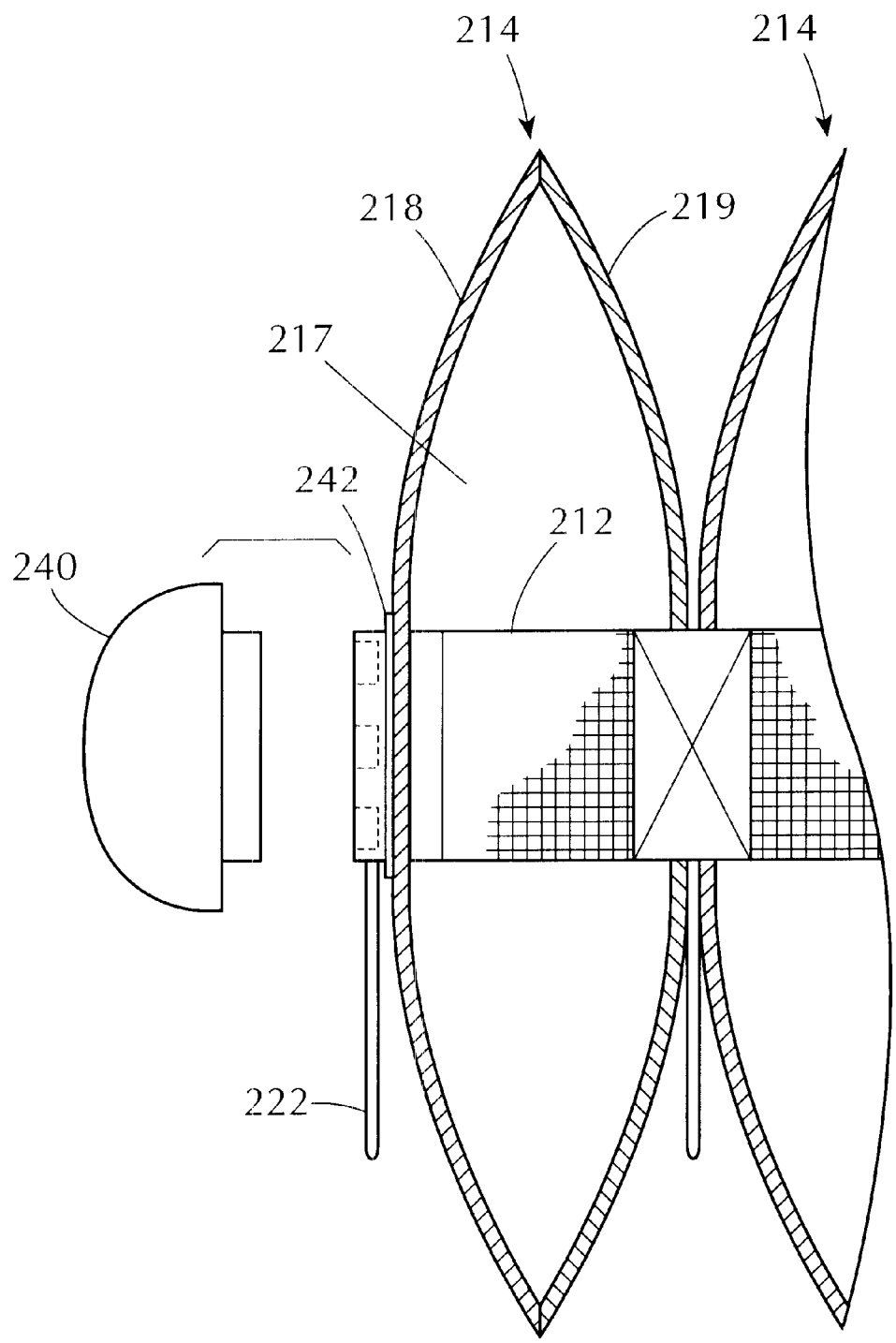
FIG. 3 is a cross-sectional view a filter device in accordance the preferred embodiment of the present invention connected to a second filter device.

FIG. 3 is a cross-sectional view of two filter devices connected together to function as a unit. As can be seen from the drawing, a tubular air chamber member 212 is provided to act as a stiffening member between the male and female connectors on opposite sides of the filter device. The air chamber member 212 defines an air chamber 220 within filter device. When multiple filters are stacked serially, the connected air chamber members 212 will combine to form an elongated air chamber for passage of filtered air towards the source of suction. The perforations allow filtered air from each stage to enter the elongated air chamber.

Although the air chamber member 212 could be constructed from a wide variety of materials, it is ideally constructed from a strong, lightweight material such as a plastic or a metal such as aluminum. In addition to forming the air chamber, the air chamber member 212 helps to impart rigidity/stability to the filter device, keeping the walls of the filter device 214 from touching, and possibly damaging, one another.

As is shown in FIG. 3, each of filter walls 218 and 219 of filter device 214 has a central aperture, the inner wall edges of which are sealingly attached around the perimeter the annular ends of member 212. As will be appreciated by those skilled in the art, the filter walls 218 could be crafted from a wide variety of air-permeable filtering materials that are suitable for filtering air as it is drawn from the environment, through the filtering material, into the air chamber 220, into a mask or other source of suction, and ultimately into the user's lungs.

As is shown in FIG. 3, the filter device 214 has an open inner volume 217 that in practice would tend to house a residual volume of filtered air. This open inner volume 217 allows greater breathing comfort to a user as compared to prior art devices that commonly have a baffle or similar structure interposed within their filter occupying all or most of what is the open inner volume 217 in the present filter device. The stiffening provided by the air chamber member 212 helps to maintain this inner volume by preventing the walls from collapsing. During normal use of the filter or filters, there is a supply of already filtered air, comprising the air in open inner volume and chamber 220, waiting to be inhaled. The more units are connected, the larger the volume of the supply of filtered air. The presence of this air provides makes breathing much easier due to the much lower pressure drop encountered during its inhalation. This can significantly increase the comfort of the user.

Figure 5:
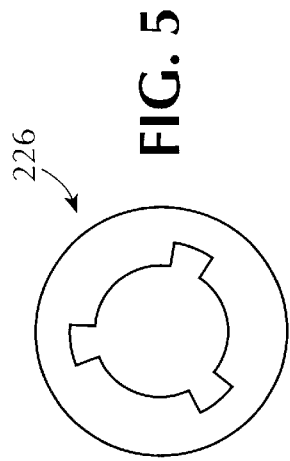
FIG. 5 is a top view of the tubular air chamber member in accordance with the preferred embodiment.
Figure 6:
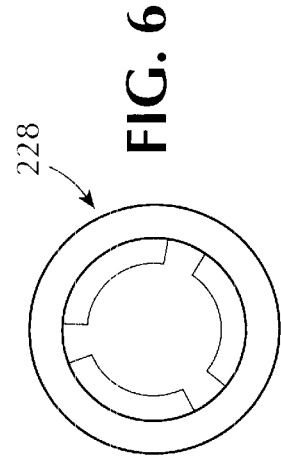
FIG. 6 is a bottom view of the tubular air chamber member in accordance with the preferred embodiment.
Figure 7:
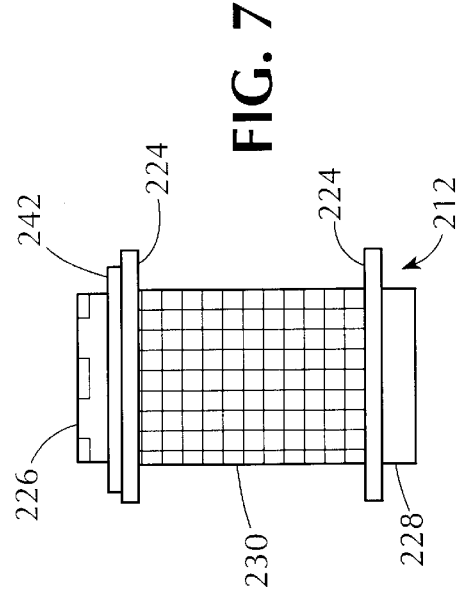
FIG. 7 is a side view of the tubular air chamber member in accordance with the preferred embodiment.
Figure 4:
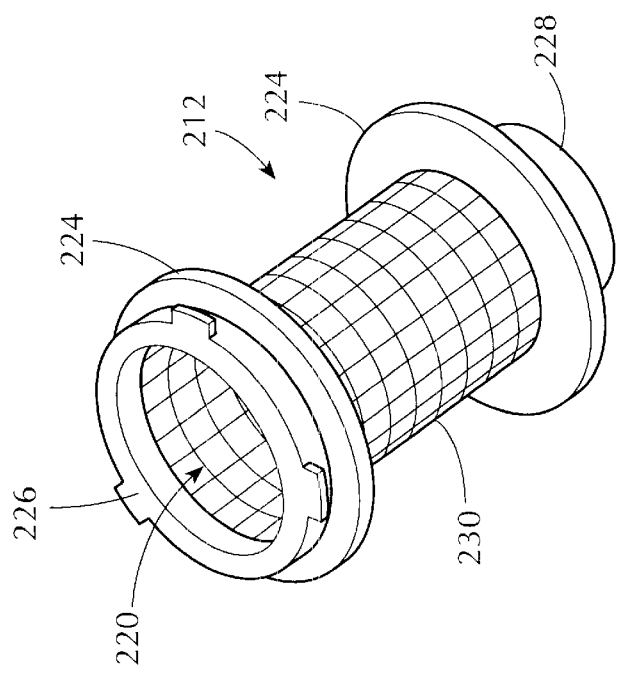
FIG. 4 is a perspective view of the tubular air chamber member in accordance with the preferred embodiment.

FIG. 4 illustrates the component parts of tubular air chamber member 212. To simplify the description, the air chamber member 212 is shown without the lever 222. As is shown in the figure, tubular member 212 has a perforated grid support 230, the perforations of which allow air to enter the chamber formed by tubular air chamber member 212. At each end of the perforated grid support a locking connector is formed, preferably a male connector 226 at one end and a female connector 228 at the other end. FIG. 5 is a top view of the tubular air chamber member 212, showing the male connector 226, and FIG. 6 is a bottom view of the tubular air chamber member 212, showing the female connector 228. FIG. 7 is a side view of the air chamber member 212. As can be seen from FIGS. 4 and 7, filter media welding ridges 224 are provided at each end of the air chamber member 212, to which annular surfaces the inner edges of each filter wall at the aperture are sealingly attached.

As can be seen from the drawings, because the filter walls are sealingly attached to the filter media welding ridges 224, the walls of the filter device are kept spaced apart by the air chamber member 212, to maintain the required open inner volume 217 within the filter 214. In addition, by virtue of the stiffened structure, the walls are less likely to collapse, even in the presence of suction. A gasket 242 is provided on an outer surface of the filter media welding ridge 224 located on the male connector side of the air chamber member 212. The gasket 242 helps to ensure a tight connection when the filter device is connected to a mask or to another filter device.

The perforated grid support 230 is of tubular construction and has a plurality of apertures therein for allowing air to be drawn from the environment, through the filter walls and the air chamber 220, out of the first (innermost) device, into the mask and ultimately into the user's lungs. In view of this, inner chamber 220 may be considered to include the entire air volume within the filter device, or devices if the filters are stacked serially, and the air chamber member 212.

Figure 8A:
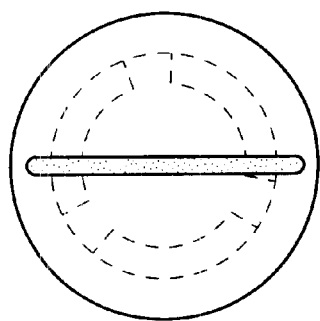
FIGS. 8A, 8B and 8C are top, bottom and side views, respectively, of an end cap for blocking air intake to an otherwise open end of the filter device of the present invention in accordance with the preferred embodiment.
Figure 8B:
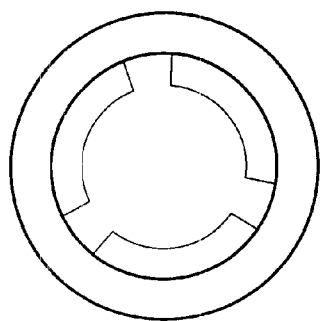
Figure 8C:
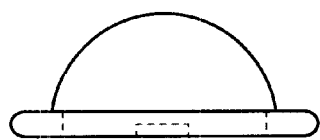

FIGS. 8A, 8B and 8C are top, bottom and side views, respectively, of end cap 240, which is shown as a female cap but which can be male or female depending upon which side of the filter unit needs to be sealed during operation. The end cap 240 provides an airtight seal to the connector at the aperture of the outermost filter device. It should be noted that while the embodiment shown in the figures utilizes bayonet style connectors, the connectors can be of any type that provides a secure seal.

Figure 9:
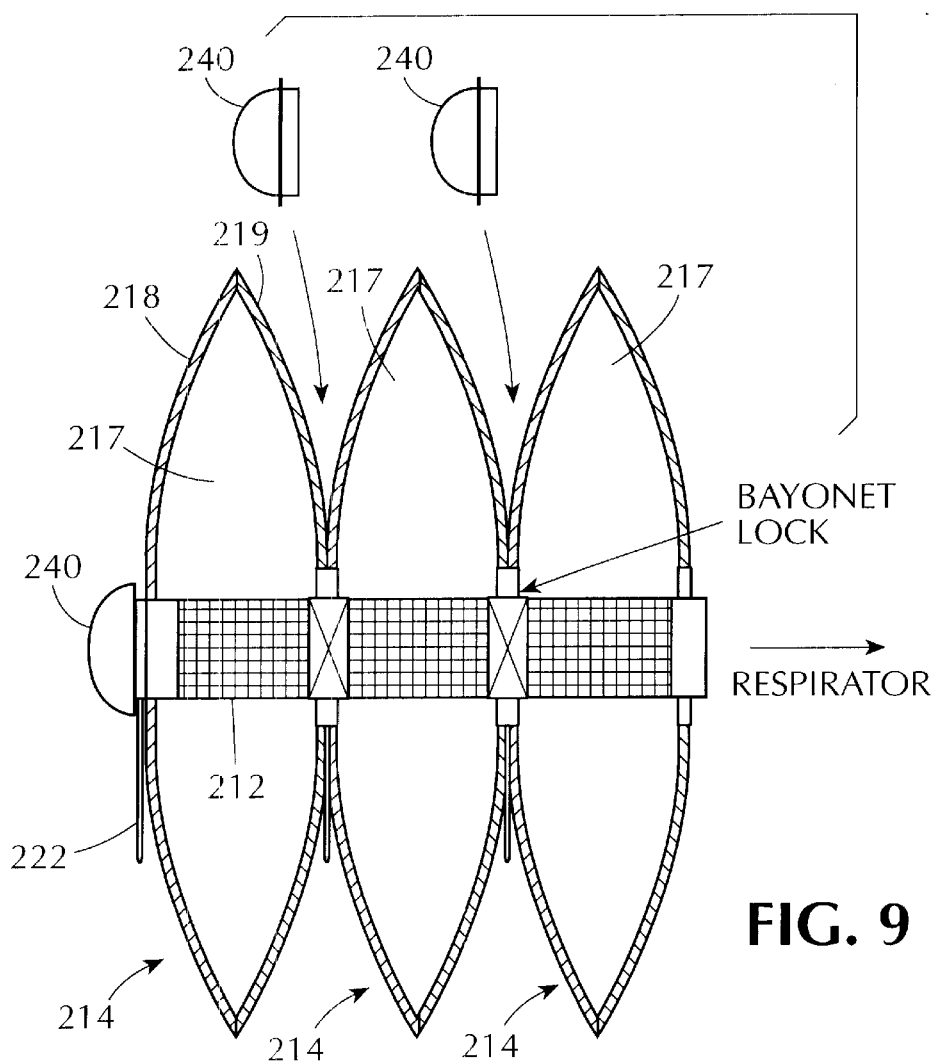
FIG. 9 shows several air filter devices in accordance with the preferred embodiment stacked together to function as a unit.
Figure 10:
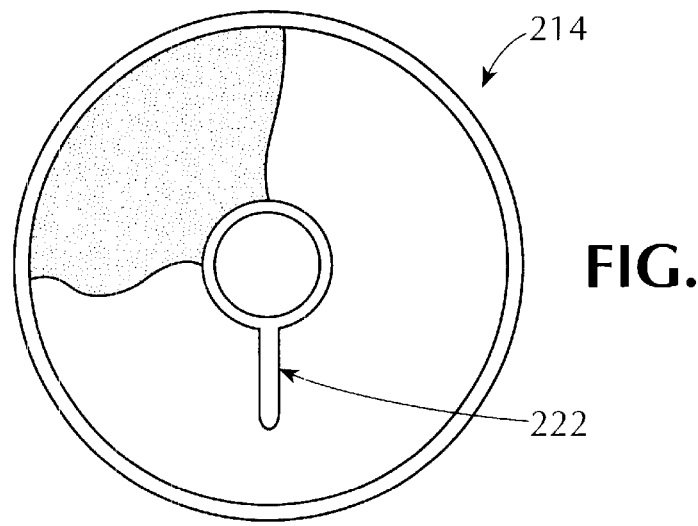
FIG. 10 is a side view showing the air filter device in accordance with the present invention.

FIG. 9 shows several of the filters 214 stacked serially to provide increased surface area for filtration. Note that the end cap 240 is only installed at the outermost connector, while other end caps 240 are not in use.

In order to meet new NIOSH categories, very sophisticated filters are needed. The fibers commonly used in such filters are electrets and melt blown micro-fibers or a combination of the two with or without other types of filters. However, these materials are somewhat fragile. Since modern filters utilize a housing that itself consists of the filter material in the form of a soft pack, it is currently difficult to attach additional filters, in series combination without damaging the filter media during the installation process. The stiffening provided by the tubular air chamber member 212 described above prevents either wall of the filter device from touching or twisting during the attaching process.

To further assist the user in attaching and detaching the filter or filters, as is shown in several of the foregoing figures, one of the connectors of each filter is provided with lever 222 that extends radially from the connector, and which allows the user to hold the filter in the lock position with respect to the mask, for example, while disengaging the end cap for attaching additional filters. The lever 222 may also be used to disengage spent filters either separately or jointly, to lessen the likelihood of contaminating the respirator or user from a heavily contaminated filter. Further, since the use of the lever 222 obviates the need for the user to handle the soft filter material in connecting and disconnecting the filters, the filter fibers are subjected to reduced stress, prolonging their life.

Figure 11:
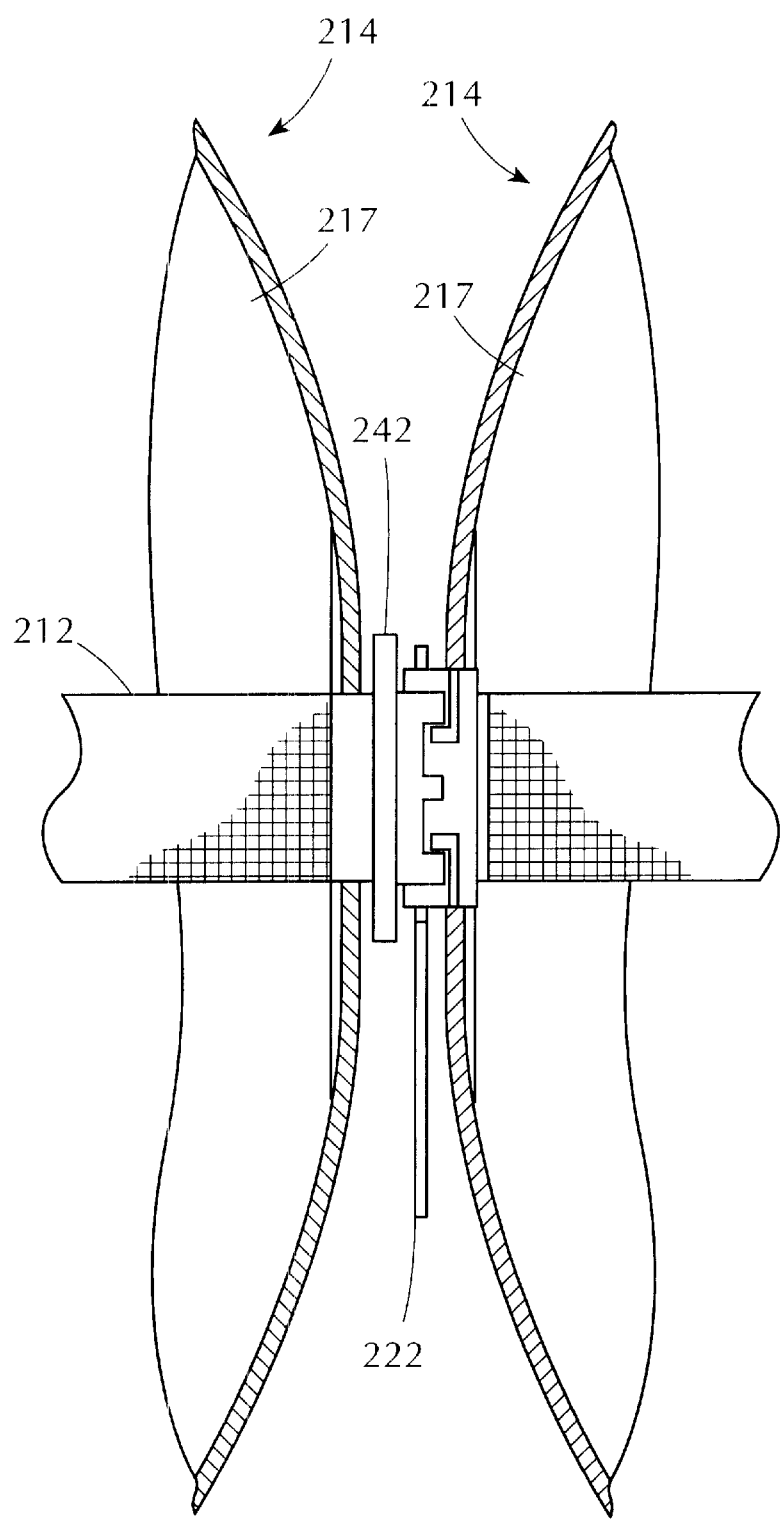
FIG. 11 is a cross-sectional view showing a detail of two filter devices according to the preferred embodiment lockingly engaged to function as a unit.

FIG. 11 is a detailed cross-sectional view showing two filters engaged with bayonet style connectors and lever 222.

Figure 13:
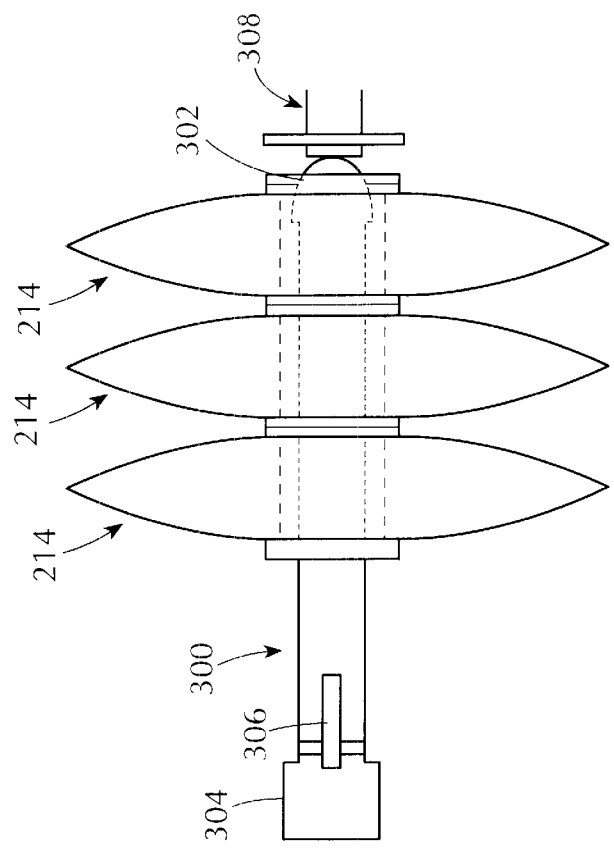
FIGS. 12 and 13 illustrate how a mask inlet seal member is used to permit a fit check procedure to be performed on a breathing mask using one or more filters in accordance with the present invention.
Figure 12:
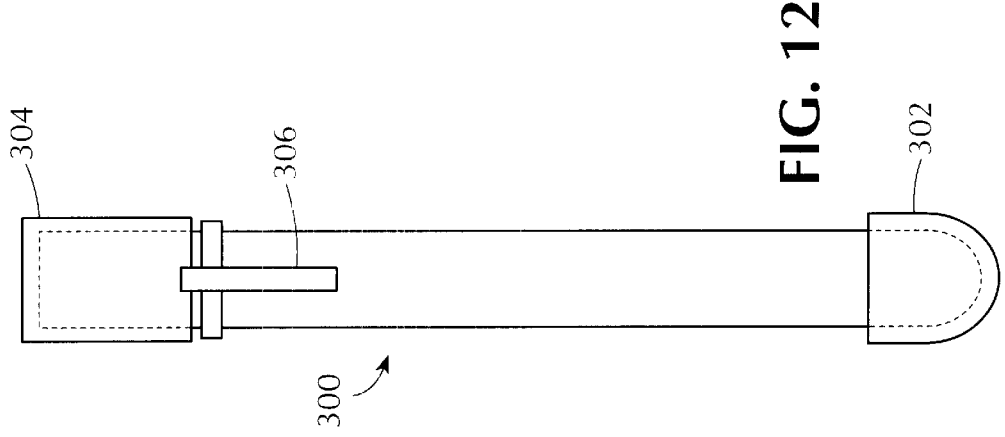

FIGS. 12–13 illustrate a feature of the present invention that allows the user of a mask utilizing the filter device 214 to carry out the fit check process as and when needed, without the assistance of another person, and with very little effort. This process is facilitated by the use of a mask inlet seal test device 300, as shown in FIG. 12. The mask inlet seal test device 300 has a soft plastic end cap 304 at one end of the device, a pocket clip 306, which allows the user to conveniently store the device in his pocket when not in use, and a soft plastic head cap 302 at the other end of the device. To perform a fit check, the wearer inserts the mask inlet seal test device 300 into the connector, whether male or female, at the open end of the outermost filter device, that is, the filter device furthest from the mask, in the case of stacked filter devices, until the soft plastic head cap 302 of the mask inlet test device 300, having passed through the apertured sides of all filter devices connected to the mask to be fitted, rests fully and firmly against the inlet connector 308 of the mask, as shown in FIG. 13. In the figure, a separation is shown between the innermost filter's connector and the mask inlet connector 308. However, this separation is shown for ease of viewing the mating of head 302 and the inlet connector 308. The innermost connector is actually connected to the mask during the fit check procedure. The user holds the mask inlet seal test device 300 in position (or two devices if the respirator or mask has dual filter connectors), and takes in a deep inhaling breath. If the mask fits properly, the wearer should experience a vacuum inside the mask, and, at the same time should not feel any leakages between the mask and his face. If the wearer either does not feel the vacuum or feels air leakage around the mask periphery, then the wearer should refit the mask and repeatedly carry out the fit check until the desired results are achieved. After achieving the desired fit, the mask inlet seal test device(s) 300 should be removed and the end cap(s) 240 should be reinserted into the outermost connector(s).

Devices that embody the present invention do not represent mere incremental improvements in pressure drop and efficiency as has been the case with prior art improvements. Instead, by providing multiple filters operating from a single air chamber and thus experiencing a single operating pressure there within, the large filter surface area of the present filter device provides for a high efficiency with a simultaneously low pressure drop.

Furthermore, with less air volume being drawn per unit surface area, the individual filters exhibit a longer useful life span. By virtue of the advantageous design of the present invention, the wearer of the breathing unit uses a relatively large filtration area to draw the required ambient air to breathe in.

Since the lung capacity of the wearer is a fixed parameter for all practical purposes, a fixed volume of air is drawn through a relatively large area of filtering material, the effective air speed passing through reduces drastically. Because of this reduced speed, filtration efficiency increases significantly. Hence this invention not only reduces pressure drop and breathing comfort, but also increases the filtration efficiency, and hence the breathing protection, at the same time. Together, these advantages allow users to breathe more comfortably even in situations that would make extended periods of activity impracticable with prior art filters. Importantly, with multiple filters the present invention can provide this markedly increased surface area and improved performance without interfering with a user's vision or mobility.

With the aforementioned improvements over the performance of prior art filter devices, it becomes clear that the present invention represents a significant advance in the art.

Of course, the filter devices described above are merely preferred embodiments of the broader invention disclosed herein. A wide variety of other embodiments are possible, as would be appreciated by those skilled in the art after learning of the present invention. Although the filters described in the foregoing discussion are generally disk-shaped and stacked in series, they could assume many shapes, and could be connected in numerous other ways including in parallel, or in an angularly related manner.

In view of the above, it should be clear that the filter devices of the present invention can be used for respirators having single, dual or multiple inlets, coupled directly or via additional structure as necessary.

It will be appreciated that filter devices often are used in adverse conditions where the filter material could be cut, torn, or otherwise damaged. In view of this, although it is not shown in the figures, it should be clear that it would be well within the scope of the invention to encase the filter devices in an air-permeable protective casing. For example, the filter devices could be shielded by a perforated plastic or metal shell, individually or collectively.

Figure 14:
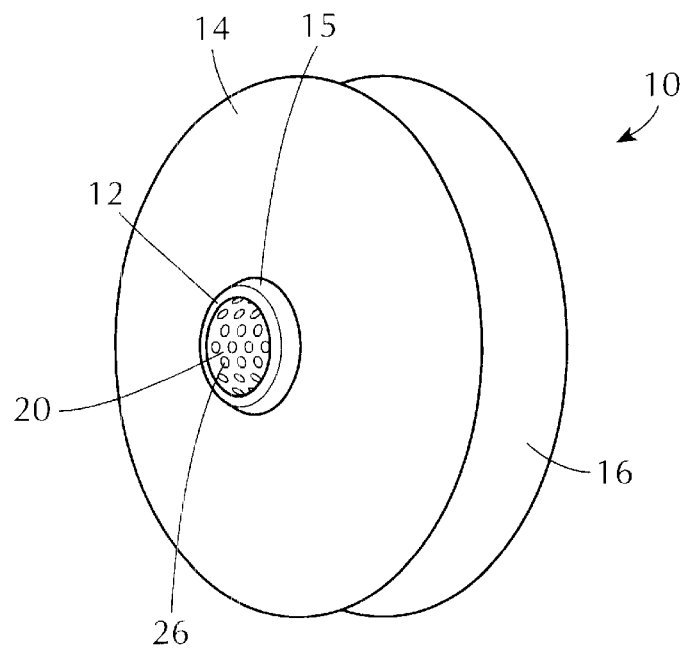
FIG. 14 is a perspective view of a multi-element filter according to another preferred embodiment of the present invention.
Figure 15:
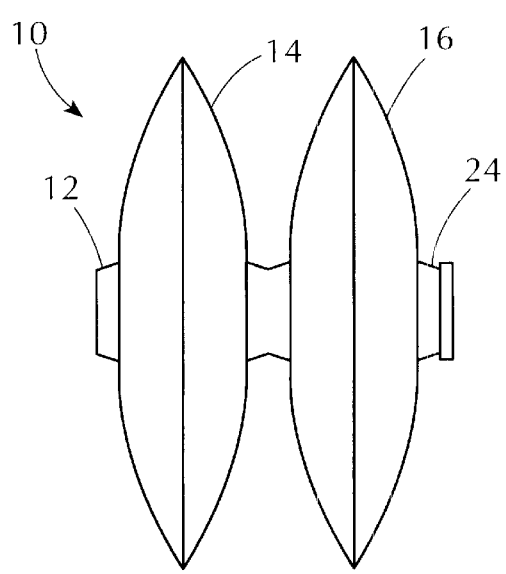
FIG. 15 is a side view of the multi-element filter.
Figure 16:
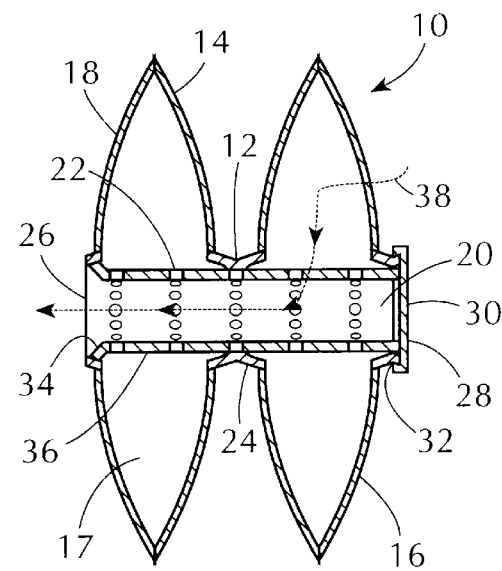
FIG. 16 is a cross-sectional view of the multi-element filter.

Another preferred embodiment of the present invention is next described with combined reference to FIGS. 14, 15 and 16. It can be seen from those figures that the filter device 10 of this embodiment is founded on an air chamber member 12, which in this preferred embodiment is essentially tubular, that defines an air chamber 20. With this, the air chamber member 12 could be termed equally aptly a breather tube or breathing tube, which is also indicated at 12. First and second filters 14 and 16 are joined to the air chamber member 12. Although the air chamber member 12 could be constructed from a wide variety of materials, the air chamber member 12 ideally will be crafted from a strong, lightweight material such as a rigid plastic or a metal such as aluminum.

As FIGS. 15 and 16 show most clearly, the first and second filters 14 and 16 in this embodiment are disk shaped and are defined by walls of filtering material 18. As one skilled in the art will appreciate, the first and second filters 14 and 16 could be crafted from a wide variety of air-permeable filtering materials 18 that are suitable for filtering air as it is drawn from the environment, through the filtering material 18, into the air chamber 20, and ultimately into a user's lungs. In any event, each of the first and second filters 14 and 16 has a central opening 15 through which the air chamber member 12 is received. The periphery of the central opening 15 of each of the first and second filters 14 and 16 is sealingly engaged with the outer surface of the air chamber member 12 to prevent unfiltered air from entering the air chamber 20. As FIG. 16 makes most clear, each of the first and second filters 14 and 16 has an open inner volume 17 that in practice would tend to house a residual volume of filtered air. Consequently, one could reasonably conclude that these open inner volumes 17 would allow greater breathing comfort to a user as compared to prior art devices that commonly have a baffle or similar structure interposed within their filter occupying what is the open inner volume 17 in the present filter device 10.

Looking at FIG. 16, where the filter device 10 is shown in cross section, one sees that the air chamber member 12 has an inner casing 22 that is tubular and an outer casing 24 that acts as an air impermeable shell about the inner casing 22 and about the air chamber 20 in general. The inner casing 22 has a plurality of apertures 36 therein for allowing air to be drawn from the environment, through the first and second filters 14 and 16, into the air chamber 20, out of the filter device 10, and, ultimately, into a user's lungs as is shown by the exemplary path 38. With this, one sees that the inner chamber 20 may be considered to include the entire air volume within the first and second filters 14 and 16 and the air chamber member 12. Although the inner casing 22 in this embodiment is depicted as being generally tube shaped, it will be clear that it could assume a variety of alternative configurations. For example, the inner casing 22 could be formed to great advantage with apertured extension members (not shown) extending into the open inner volumes 17 of the first and second filters 14 and 16 to maintain the outer layers of the first and second filters 14 and 16 apart as is shown in FIG. 16.

The air chamber member 12 has a first end 26 for coupling to a source of suction, such as a user's lungs, through a respirator, mask, tube or other means. Naturally, such a coupling could be accomplished by any one of a number of coupling mechanisms. For example, in this embodiment, the first end 26 of the air chamber member 12 has an annular furrow 34 on its inner surface for engaging an annular ridge on an outside structure, such as a respirator or mask (not shown). Alternatively, the air chamber member 12 could achieve sealed communication with a user through another filter device 10 as will be discussed more fully in the following paragraph.

The air chamber member 12 has a second end 28 that could be sealed relative to the environment by an end cap 30 that engages an annular ridge 32 on the air chamber member as is shown in FIG. 16. Alternatively, the filter device 10 could be coupled to another, similar filter device 10 as by snapping the annular ridge 32 of a first filter device 10 into engagement with the annular furrow 34 of a second filter device 10 whereby the first and second filter devices 10 and 10 would be coupled in series. As the previous embodiments have made clear, one can create a filter device just having a single filter with the filter device being readily able to couple to additional filter devices to create a multi-filter arrangement. Furthermore, it will be clear that the filter device 10 could be formed with any number of filters 14, 16, and possibly more such that coupling filter devices 10 together would be obviated. Again, the second end 28 of the second filter device 10 could be sealed by an end cap 30 or coupled to a third filter device 10. In any case, the outer casing 24, and thus the air chamber 20, will be sealed relative to the environment except for air that enters the air chamber 20 through the first and second filters 14 and 16 and is filtered thereby.

It should be noted that while the invention has been described with respect to certain preferred embodiments, it would be apparent to those skilled in the art that changes and modifications may be made without departing from the scope of the invention.

With this in mind, the appended claims define the scope of the invention, which is not limited to the preferred embodiments disclosed herein. These claims should be deemed to include all to include all equivalent constructions insofar as they do not depart from the spirit and scope of the present invention.

What is claimed is:

1. A stackable filter device for filtering an input to a source of suction, said filter device comprising:

a substantially hollow filter pad having first and second filter walls constructed of a filter material, the periphery of said first filter wall being sealingly engaged to the periphery of said second filter wall to form said filter pad, each of said filter walls having an aperture;

said first and second filter walls each having an annular member fixedly contacted to the circumferential edge of the aperture; and said annular members supporting the aperture, and being structured so as to integrally form connectors operable to removably connect said filter device to the source of suction or to an additional filter device on a first side of said filter device and to a sealing end cap or an additional filter device on a second side of said filter device.

2. A filter device according to claim 1, further comprising:

a stiffening member passing through said filter device, said stiffening member being rigidly attached at each end thereof to one of said annular members.

3. A filter device according to claim 2, wherein said stiffening member is of tubular shape, said stiffening member comprising a perforated tubular shaft forming an air passage through said filter device.

4. A filter device according to claim 3, wherein the air passage contains only air that has been filtered by one or more of said filter walls.

5. A filter device according to claim 3, wherein when said filter device is connected in series with one or more other of said filter devices, the stiffening members of the connected filter devices combine to create an elongated air chamber for passing filtered air to the source of suction.

6. A method for using the filter device according to claim 3, in which the source of suction is a respirator mask having an input port and a connector at an outermost side of the filter device is sealingly engaged with the sealing end cap during normal operation of the respirator mask, said method comprising a fit check process to be performed while said filter device or devices are connected to the respirator mask, the fit check process comprising the steps of:

removing the sealing end cap;

inserting an elongated mask inlet seal member completely through the air chamber in the direction of the mask until a tip end of the mask inlet seal member sealingly engages the input port of the respirator mask; and the user inhaling deeply and adjusting the position of the mask until a tight seal is achieved.

7. A filter device according to claim 3, wherein the aperture in each filter wall is centrally located in relation to the filter wall.

8. A filter device according to claim 1, wherein one of said connectors is a male connector and one of said connectors is a female connector.

9. A filter device according to claim 8, wherein the connectors are of a bayonet type.

10. A filter device according to claim 8, wherein the connectors are of a press-fit type.

11. A filter device according to claim 8, wherein the connectors are of a push-and-twist type.

12. A multi-element air filter device comprising:

a substantially hollow air chamber member, the air chamber member being structured to form an elongated inner air chamber to allow for passage of air along its length, the air chamber member including an inner casing having perforations along an outer surface thereof for allowing entry of air into the air chamber and an air-impermeable outer casing; and substantially hollow plural filter elements each including first and second filter walls constructed of filter material, the periphery of the first filter wall being sealingly engaged to the periphery of the second filter wall, each of the filter walls including an aperture, inner peripheral edges of each aperture being sealingly engaged with the outer casing to allow free passage of filtered air to the air chamber but to prevent passage of unfiltered air to the air chamber, a first end of the air chamber member being structured to mate with an input to a source of suction.

13. A multi-element air filter device according to claim 12, wherein a second end of the air chamber member is structured so as to mate with a sealing end cap for preventing entry of unfiltered air into the second end, or with a first end of another multi-element air filter device.

14. A multi-element air filter device according to claim 12, wherein the inner casing is of tubular shape.

15. A multi-element air filter device according to claim 14, wherein the aperture in each filter wall is centrally located in relation to the filter wall.

16. A multi-element air filter device comprising:

a substantially hollow air chamber formed by a casing of material shaped so as to allow for passage of air along its length; and substantially hollow plural filter elements each including first and second filter walls constructed of filter material, the periphery of the first filter wall being sealingly engaged to the periphery of the second filter wall, each of the filter walls including an aperture, inner peripheral edges of each aperture being sealingly engaged with the casing to allow free passage of filtered air to the air chamber but to prevent passage of unfiltered air to the air chamber, a first end of the air chamber being structured to mate with an input to a source of suction.

17. A multi-element air filter device according to claim 16, the air chamber having an inner chamber member running along the length of the air chamber, the inner chamber member being perforated to allow filtered air into the air chamber.

18. A multi-element air filter device according to claim 17, wherein the chamber is of tubular shape.

19. A multi-element air filter device according to claim 16, wherein a second end of the air chamber is structured so as to mate with a sealing end cap for preventing entry of unfiltered air into the second end, or with a first end of another multi-element air filter device.

* * * * *